(12) United States Patent
Konrad et al.

(10) Patent No.: US 8,235,166 B2
(45) Date of Patent: Aug. 7, 2012

(54) SUPERIMPOSITION DEVICE FOR VEHICLE STEERING SYSTEM

(75) Inventors: Johann Konrad, Eichberg (DE); Ralf Gmunder, Appenzell (CH)

(73) Assignee: ThyssenKrupp Prestia AG, Eschen (LI)

( * ) Notice: Subject to any disclaimer, the term of this patent is extended or adjusted under 35 U.S.C. 154(b) by 106 days.

(21) Appl. No.: 12/863,014

(22) PCT Filed: Jan. 16, 2009

(86) PCT No.: PCT/EP2009/000256
§ 371 (c)(1),
(2), (4) Date: Jul. 15, 2010

(87) PCT Pub. No.: WO2009/092545
PCT Pub. Date: Jul. 30, 2009

(65) Prior Publication Data
US 2011/0024223 A1    Feb. 3, 2011

(30) Foreign Application Priority Data

Jan. 21, 2008  (DE) .......................... 10 2008 005 421

(51) Int. Cl.
*B62D 5/00* (2006.01)
(52) U.S. Cl. ....................................................... 180/444
(58) Field of Classification Search .................. None
See application file for complete search history.

(56) References Cited

U.S. PATENT DOCUMENTS 7,845,460 B2 * 12/2010 Waibel et al. ................. 180/444
2010/0016116 A1 * 1/2010 Kenez et al. .................. 475/339

FOREIGN PATENT DOCUMENTS

| DE | 600469 C | 7/1934 |
| DE | 19906703 A1 | 8/2000 |
| EP | 1714851 A1 | 10/2006 |
| WO | WO-2006072186 A1 | 7/2006 |

OTHER PUBLICATIONS

English language version of the International Preliminary Report on Patentability issued in related International Application No. PCT/EP2009/000256 on Aug. 10, 2010.

* cited by examiner

*Primary Examiner* — Tony Winner
(74) *Attorney, Agent, or Firm* — Connolly Bove Lodge & Hutz LLP

(57) ABSTRACT

A rotational speed superimposition device for a vehicle steering system is proposed, having an output shaft (2) which is aligned towards the input shaft (1) in its axial direction (22), having a first carrier arrangement (6) which rotatably positions the output shaft (2) and the input shaft (1) at least partly supported, having an auxiliary drive (5, 10) with a rotor (5) which is connected in an operative, torque-proof manner to a first gear element (4) of a superimposition gear unit (7), and having a second carrier arrangement (11) which is arranged in a fixed manner on the chassis and which holds the auxiliary drive (5, 10) and supports the rotor (5) so that it can rotate, wherein the rotor (5) of the auxiliary drive (5, 10) coaxially surrounds the output shaft (2) and/or the input shaft (1), and wherein the superimposition gear unit (7) transmits the rotational speed of the rotor (5) to the rotational speed of the output shaft (2) at a rotational speed ratio that is less than 1. Improved noise damping is achieved because an intermediate piece (3) is arranged between the rotor (5) and the first gear element (4) in such a way that the rotor (5) is connected in an operative manner to the first gear element (4) in the rotational direction only by interconnecting the intermediate piece (3).

10 Claims, 5 Drawing Sheets

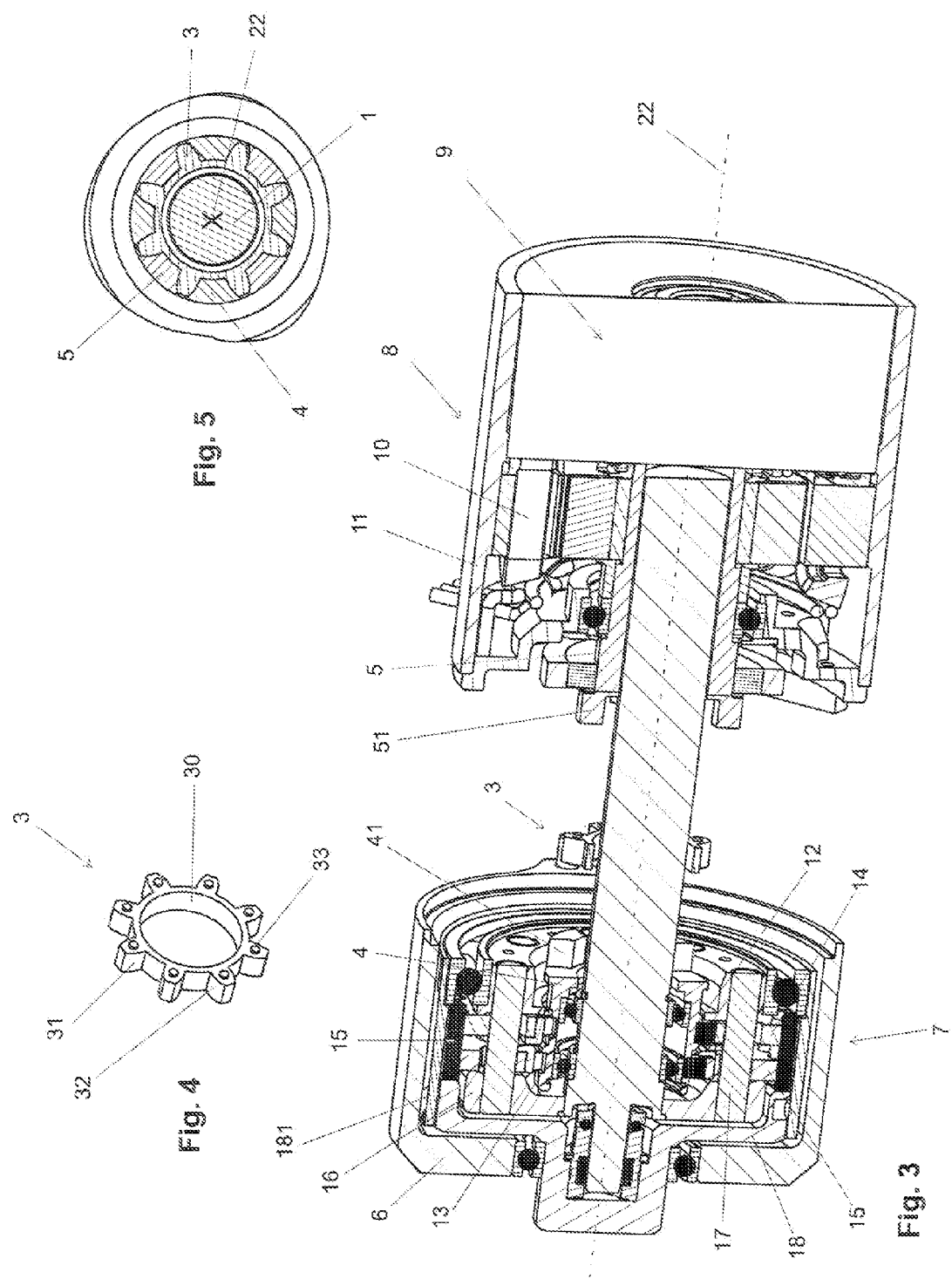

SUPERIMPOSITION DEVICE FOR VEHICLE STEERING SYSTEM

CROSS-REFERENCE TO RELATED APPLICATIONS

This application is a 35 U.S.C. §371 National Stage Application of International Application No. PCT/EP2009/000256, filed Jan. 16, 2009, which claims the benefit of German Patent Application No. 102008005421.6, filed Jan. 21, 2008, the entire contents of which are incorporated herein by reference in their entireties.

PRIOR ART

The invention relates to a vehicle steering mechanism for motor vehicles having a drive for assisting the steering mechanism, which drive is connected via a gear arrangement with an, output shaft to a steering gear unit according to the preamble of claim 1.

Such drives with a gear unit are used in vehicle steering mechanisms for electrically assisted steering boosters for power-assisted steering and for rotational speed superimposition devices.

With electrically assisted steering boosters for power-assisted steering, a servo force is coupled onto the steering shaft or onto the transversely located steering rack of the steering system from an electric motor having a downstream connected reduction gear unit corresponding to the deflection of the steering wheel. As a result, the effort at the steering wheel for steering the vehicle is reduced. It is also possible to provide the supply of booster force via electronic control means at the correct point in time and according to the desired behaviour, for instance even correspondingly more strongly when the vehicle is standing still. Such electrically assisted steering boosters for power-assisted steering are therefore nowadays being increasingly employed.

A further important area of application of such electric motor gearing arrangements in steering systems relates in particular to the rotational speed superimposition device with an auxiliary drive for a steering system for track-free motor vehicles which superimposes the rotational speeds of the auxiliary drive and of the steering interventions at the steering wheel by the driver and transfers them to the steering movement of the wheels.

Such rotational speed superimposition devices, insofar as they are applied in steering systems, are also referred to in the prior art as angle of rotation superimposition devices. Rotational speed superimposition and superimposition of the angle of rotation are synonyms.

A range of systems are known in the prior art for constructing electric auxiliary drives with a gearing arrangement for use in the previously mentioned arrangements.

For a drive free of play, a cycloid gear unit with a large reduction ratio is known from patent specification DE 600 469. Here, immediate, direct, coaxial coupling of the drive motor to the gear unit is advantageously provided. Decoupling of the input shaft from the gear unit input shaft is not provided.

Rotational speed superimposition gear units are often implemented by means of a planetary gear unit, worm drive gear unit or also by means of a harmonic drive gear unit.

In the class-defining DE19996703A1, an actuating element of this kind or a superimposition device of this kind is introduced based on a planetary gear unit. In DE19996703A1, an actuating element is proposed, in which an input shaft for coupling to the steering wheel of the steering system and an output shaft for coupling to the steering gear unit of the steering system and a rotor shaft of an electric motor, which is connected to the superimposition gear unit, are coupled as a corresponding shaft gear unit based on a planetary gear unit. If the rotor of the electric motor is rotated, then the rotational speed of the input shaft, superimposed with the rotational speed of the rotor, is discharged into the output shaft.

In WO2007038884, further variants of superimposition devices are introduced, wherein different types of gear unit are described. The application discloses corresponding systems, in FIG. 3 based on a harmonic drive gear unit, in FIGS. 4 and 5 based on a crown wheel gear unit and in FIG. 6 based on a wobble gear unit.

The rotor of the auxiliary drive being coupled to a first gear element of the superimposition device is the common feature of all the previously mentioned gear units.

All of the previously mentioned examples from the prior art have the disadvantage that they operate with a considerable, unwanted amount of noise.

OBJECT OF THE INVENTION

The object of the invention is to provide a superimposition device for a steering system of a motor vehicle, which allows noise reduction to be improved with simple mode of construction.

APPROACH TO THE SOLUTION

The object is achieved by a rotational speed superimposition device for a vehicle steering system having the features of claim 1.

Because with a rotational speed superimposition device, having an output shaft which is aligned towards the input shaft in its axial direction, having a first carrier arrangement which rotatably positions the output shaft and the input shaft at least partly supported, having an auxiliary drive with a rotor which is connected in an operative, torque-proof manner to a first gear element of a superimposition gear unit, and having a second carrier arrangement which is arranged in a fixed manner on the chassis and which holds the auxiliary drive and supports the rotor so that it can rotate, wherein the rotor of the auxiliary drive coaxially surrounds the output shaft and/or the input shaft, and the superimposition gear unit transmits the rotational speed of the rotor to the rotational speed of the output shaft at a rotational speed ratio that is less than 1, an intermediate piece is arranged between the rotor and the first gear element in such a way that the rotor is connected in an operative manner to the first gear element in the rotational direction only by interconnecting the intermediate piece, direct transfer of noise from the rotor to the superimposition gear unit is prevented. By means of the solution according to the invention, the gear unit, which brings about the steering angle superimposition, is as regards noise separated from the auxiliary drive, which is preferably designed as an electric auxiliary drive, more preferably based on a permanently excited, brushless electric motor.

In addition to the gear unit and the auxiliary drive, a safety brake can be provided which in case of failure allows the steering intervention direct access to the steering pinion. Safety devices of this kind are known in various embodiments in the prior art and therefore do not need to be explained in more detail here.

The solution according to the invention enables the rotational speed superimposition device to be arranged compactly. In doing so, the auxiliary power drive, safety brake and superimposition gear unit components are arranged coaxially in relation to one another but separated from one another. The components can even be arranged in separate housing parts with elevated noise isolation. The intermediate piece enables occurring positional tolerances to be compensated.

Furthermore, by means of the solution according to the invention the torque is transferred from the rotor of the auxiliary drive by interpositioning the elastomer, which has elastic and damping properties, to the first gear element of the superimposition gear unit. As a result, a direct, metal contact between corresponding surfaces on rotor and gear element, via which a torque is to be transferred, is prevented.

DESCRIPTION OF THE FIGURES

Exemplary embodiments of the invention are described below with the aid of the drawing.

FIG. 3 shows the rotational speed superimposition device according to FIG. 2 with components pulled apart;

FIG. 4 shows an intermediate piece for the coupling in a perspective illustration;

FIG. 5 shows the coupling of the components from FIG. 2 in a cross-section;

FIG. 1 shows an embodiment of the rotational speed superimposition device in a perspective illustration having an input shaft 1 and an output shaft 2 which are coaxially arranged and can be rotated about a rotation axis 22. The rotation axis 22 defines an axial direction for the entire arrangement, a circumferential direction and correspondingly the radial direction, which will be subsequently referred to. The rotational speed superimposition device has a gear unit 7 and a coaxial auxiliary drive 8 which surround the shafts 1 and 2.

Figure 1:
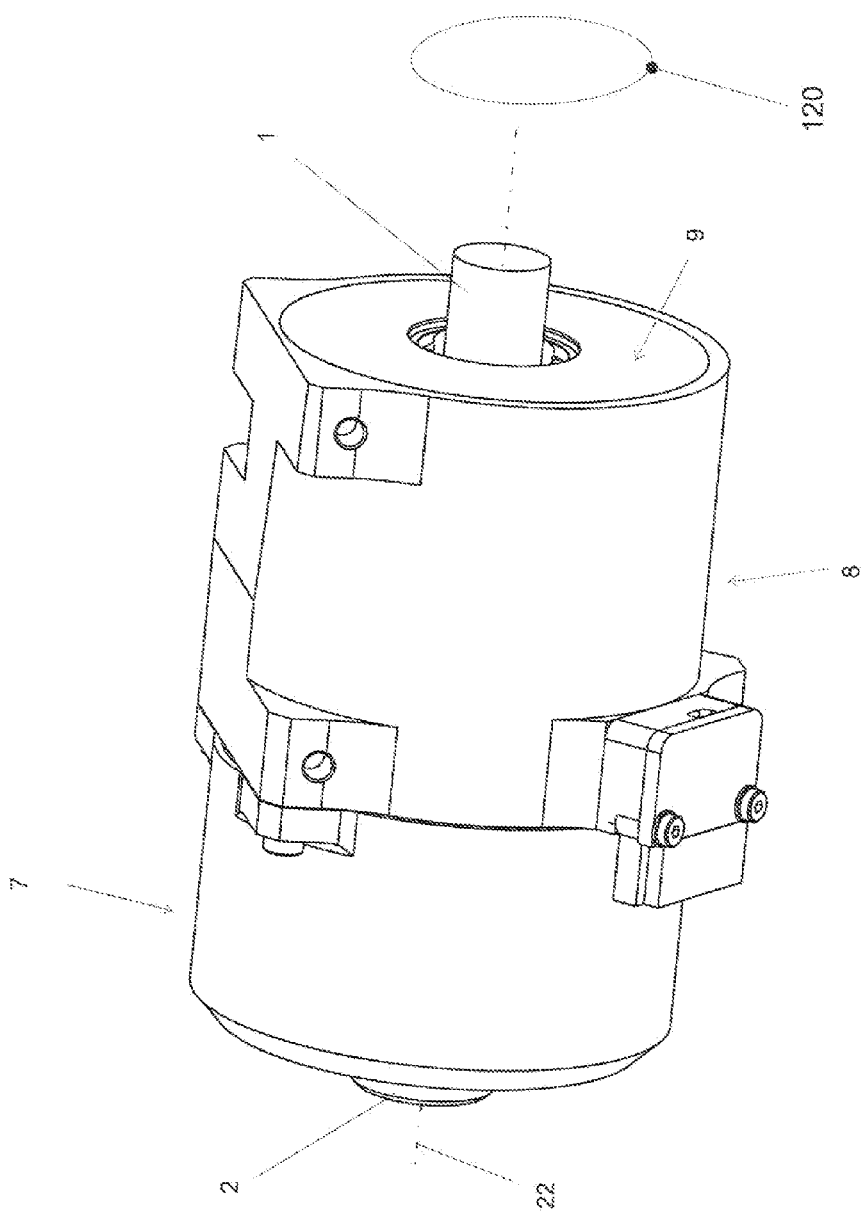
FIG. 1 shows an exemplary embodiment of a rotational speed superimposition device in a perspective illustration.
Figure 2:
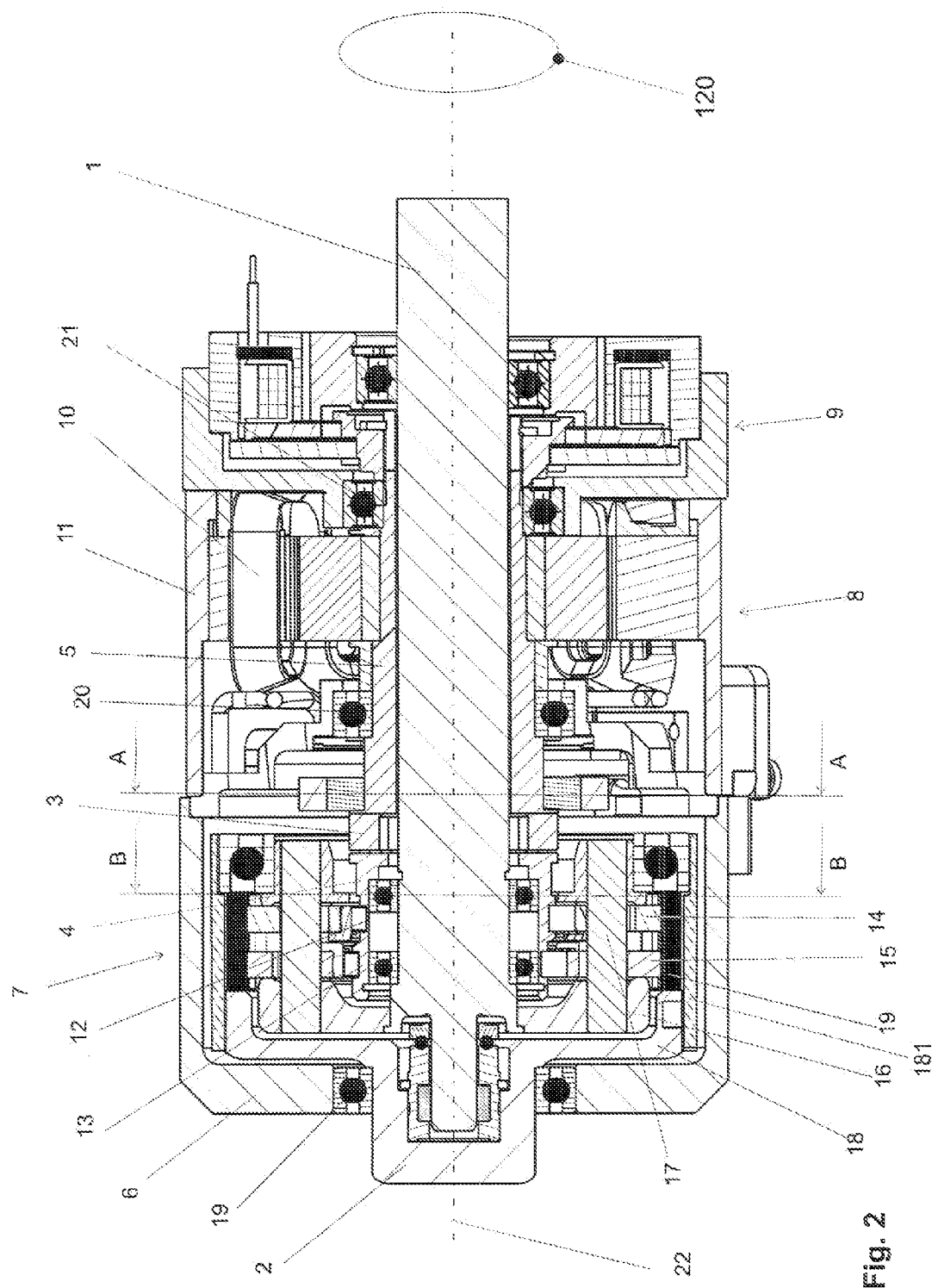
FIG. 2 shows an exemplary embodiment of a rotational speed superimposition device with a cycloid gear unit, in a longitudinal section.
Figure 8:
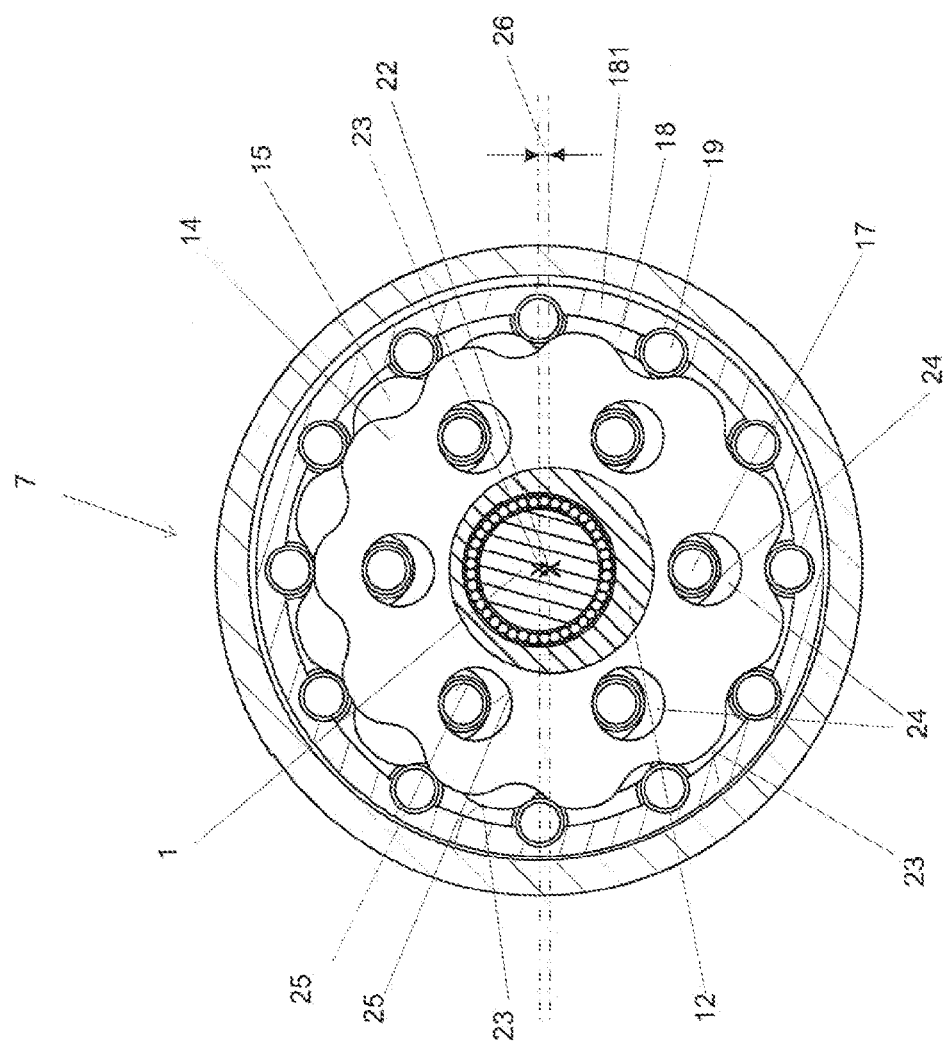

The rotational speed superimposition device is described in more detail in FIGS. 2, 3 and 8.

The rotational speed superimposition device, as shown in FIGS. 2 and 3, comprises the following components:
- the input shaft 1, with a rotation axis 22;
- the input shaft 2, with a rotation axis 22;
- an auxiliary drive 8, 5, 10 which drives a rotor 5 with a rotation axis 22;
- an intermediate piece 3;
- a first gear element 4;
- a second carrier arrangement 11, arranged in a fixed manner on the chassis, which holds a stator 10 of the auxiliary drive 8, 5, 10 and supports the rotor 5 of the auxiliary drive 8, 5, 10 in bearings 20, 21 so that it can rotate;
- a separate, first carrier arrangement 6 which supports the input shaft 1, the output shaft 2 and the first gear element 4 in bearings 19 so that they can rotate;
- two disc cams 14, 15 arranged so that they rotate eccentrically about the longitudinal axis 22, having an undulating outer contour 23, wherein the disc cams 14, 15 have a circular, coaxially arranged central opening in the centre, and wherein at least two holes 24 are provided on a concentric reference circle of the discs which is located between the central opening and the outer contour;
- a first carrier 16 arranged in a torque-proof manner on the input shaft 1, the axis of which lies in the longitudinal axis 8 and can be rotated about this, wherein driving pins 17 are arranged on the first carrier in the parallel direction to the longitudinal axis 22, which engage in the holes of the disc cams 14, 15 and slide or roll off on the inner surfaces 25 of the holes.
- a second carrier 18, arranged on the output shaft 2, the axis of which lies in the longitudinal axis 22 and can be rotated about this, wherein outer pins 19 are arranged, radially spaced apart on the second carrier in the parallel direction to the longitudinal axis 22 on a reference circle which is concentric to the longitudinal axis, on which the undulating outer contour 23 of the disc cams 14, 15 rolls off by means of the eccentric, radially wobbling movement;

wherein the rotor 5 is supported so that it can coaxially rotate about the input shaft 1 and the common longitudinal axis 22 and is connected in an operative manner to the auxiliary drive 8, 5, 10, and the rotor 5 is connected in an operative manner in the rotational direction via the intermediate piece 3 to the first gear element 4, and wherein the first gear element 4 for each disc cam 14, 15 holds an eccentric 12, 13 assigned to this, with an eccentricity 26 with respect to the longitudinal axis 22, and the eccentric 12, 13 engages in the central openings of the respectively assigned disc cam 14, 15, so as to bring about a movement of the assigned disc cams 14, 15 rotating about the longitudinal axis 22 and laterally wobbling, wherein the input and output shafts 1, 2 and the first gear element 4 are located with a centre of rotation in a single longitudinal axis 22.

As an equivalent to the rotary transmission between the input shaft 1 and the disk cam 14, 15 moving in a laterally wobbling manner by means of the holes and the driving pins 17, 19, the rotary transmission can also be effected via an Oldham coupling or another coupling which compensates eccentricities.

In an alternative embodiment, the disc cam mechanism can be formed by a single disc cam or also by more than two disc cams. The design with two disc cams, as illustrated in FIGS. 2, 3 and 8, is preferred because in doing so running noise can be reduced to a sufficiently low level and also using a simpler form of implementation.

An engaging piece 41 of the first gear element 4 and another engaging piece 51 of the rotor 5 form a positive-fit coupling for a torque-proof drive-connection. An intermediate piece is 3 inserted between the engaging pieces 41 and 51 as a damping element.

FIG. 4 shows the intermediate piece 3 for the coupling in a perspective illustration. The intermediate piece 3 has an annular base body 30 with a number of teeth 31 pointing radially outwards. The teeth 31 are provided with tooth faces 32 which in this exemplary embodiment take a form similar to an involute. The central point of the involute is thereby located outside the root circle of the teeth 31, thus in this exemplary embodiment a radial distance from the outer circumferential surface of the annular base body 30. The load is hereby uniformly distributed on the teeth 31 and as a result there is less wear and tear.

Projections are arranged as spacers 33 approximately centrally on the front faces of the teeth, pointing in the axial direction, at least on one side. These projections 33 abut in the axial direction on the adjacent shafts, put more precisely, they ensure that there is a certain axial distance between the engaging pieces 51 of the rotor 5 and the engaging pieces 41 of the first gear element 4 and thereby also prevent surface-contact of the shafts with the intermediate piece 3, which in operation could cause friction and wear and tear. As a result, all-over deformation of the intermediate piece is prevented, so that thermal expansion differences or tolerances can be accommodated well. The intermediate piece 3 is manufactured from an elastomer in one piece.

FIG. 5 shows the coupling of the components from FIG. 2 in a cross-section. It is clear that the surface shape of the active surfaces, advancing and trailing in the circumferential direction of the engaging pieces 41 and 51, is adapted to the faces 32 of the teeth 31, so that here also a surface contact is ensured for torque transmission.

Figure 6:
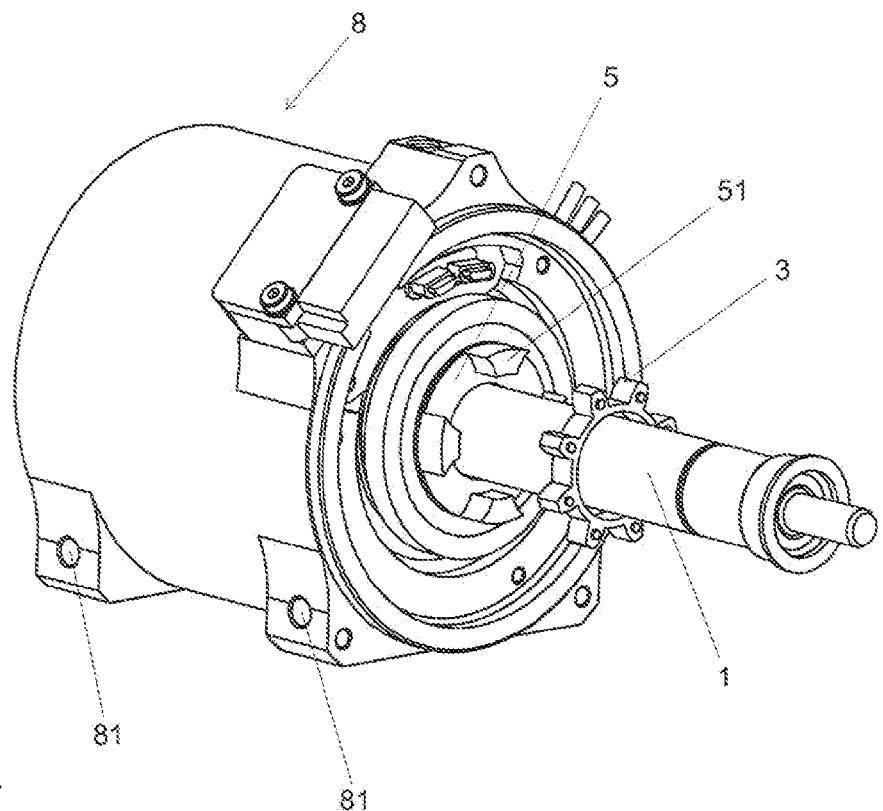
FIG. 6 shows the electric motor of the rotational speed superimposition device according to FIG. 2 in a perspective view of the coupling side.

FIG. 6 shows the electric motor of the rotational speed superimposition device according to FIG. 2 in a perspective view of the coupling side. Components which have already been described have the same reference numbers. The design of the engaging piece 51 in the form of a claw coupling can be identified here. The adaptation of the driving surfaces to the shape of the tooth faces 32 of the intermediate piece 3 is also illustrated.

Figure 7:
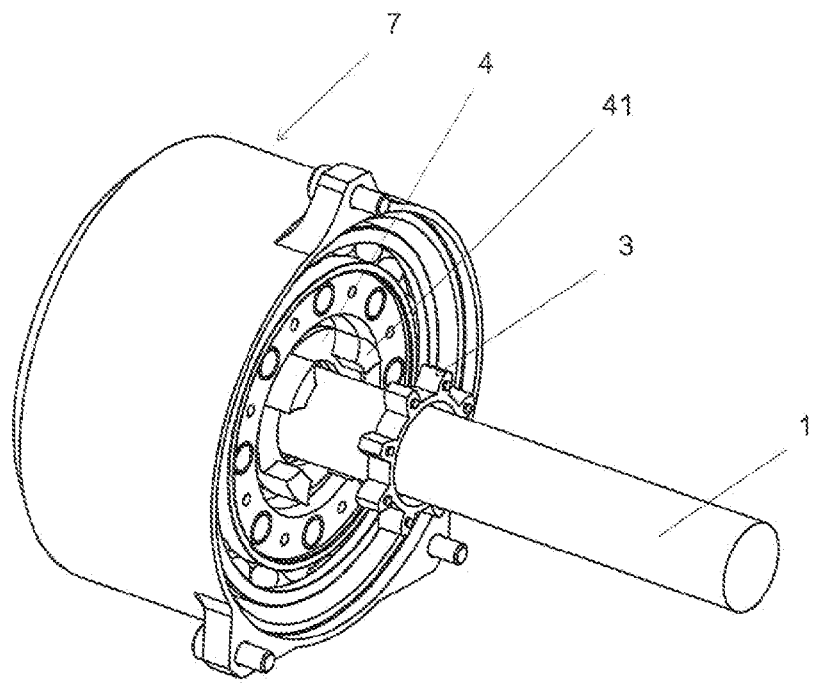
FIG. 7 shows the gear component of the rotational speed superimposition device according to FIG. 2 in a perspective view of the coupling side and FIG. 8 shows a cycloid gear unit as it can be used for the gear component of the rotational speed superimposition device according to FIG. 2, in a cross-section.

FIG. 7 shows the gear assembly of the rotational speed superimposition device according to FIG. 2 in a perspective view of the coupling side. The design of the engaging piece 41 is also illustrated here, which is practically identical to that of the engaging piece 51.

In one preferred embodiment, which is not shown in the drawing, the intermediate piece 3 has guiding links instead of the projections 33, which are arranged on some or all of the front faces, pointing in the axial direction, of the intermediate piece 3. The guiding links project from the teeth 31 of the intermediate piece by a few millimetres in the axial direction. At least one of the engaging pieces 41 and 51 is then correspondingly modified so that it can accommodate the guiding links during assembly. These guiding links ensure that when fitting the motor unit and the gear unit to one another the intermediate piece is introduced into the opposing engaging piece such that correct positioning must already be effected before the final joining together of the gear unit 7 and the auxiliary drive 8. The guiding links already force this positioning when the motor unit and the gear unit are still at a distance from one another of the dimension of the height of the guiding links, so that the positioning can also be controlled visually.

In addition, a particularly compact embodiment can be provided, wherein the diameter of the engaging pieces 41 and 51 is smaller than the annular base body 30 of the intermediate piece 3. With this alternative, the teeth of the intermediate piece are then arranged pointing radially inwards on the annular base body. This design is particularly compact in diameter, so that additional assembly space is available in this area of component assembly around the coupling area. An annular sensor element, for example, can be arranged in this assembly space, for recording the angle of rotation and the actual position of the shaft lying therein.

The invention claimed is:

1. A speed superimposition device for a vehicle steering system having:
   an output shaft which aligned, in an axial direction, towards an input shaft,
   a first carrier arrangement configured to rotatably position the output shaft and the input shaft such that the output shaft or the input shaft is at least partly supported,
   an auxiliary drive with a rotor which is connected in an operative, torque-proof manner to a first gear element of a superimposition gear unit, and
   a second carrier arrangement which is arranged in a fixed manner on a chassis, and which holds the auxiliary drive and supports the rotor so that the rotor is enabled to rotate,
   wherein the rotor of the auxiliary drive coaxially surrounds the output shaft, the input shaft, or both,
   wherein the superimposition gear unit is configured to transmit rotational speed of the rotor to the output shaft at a rotational speed ratio that is less than 1, and further comprising:
   an intermediate piece formed from a material having elastic and damping properties arranged between the rotor and the first gear element in such a way that the rotor is connected in an operative manner to the first gear element in the rotational direction only by interconnecting the intermediate piece.

2. The rotational speed superimposition device for a vehicle steering system according to claim 1, wherein the material is an elastomer or a plastic.

3. The rotational speed superimposition device for a vehicle steering system according to claim 1, wherein the intermediate piece has an annular base body and a number of teeth pointing radially outwards.

4. The rotational speed superimposition device for a vehicle steering system according to claim 1, wherein the intermediate piece has teeth with convex tooth faces in the form of an involute toothing.

5. The rotational speed superimposition device for a vehicle steering system according to claim 4, wherein the tooth faces of the intermediate piece have a centre of curvature which is radially outside the root circle of the teeth.

6. The rotational speed superimposition device for a vehicle steering system according to claim 1, wherein the first gear element bears an engaging piece, and wherein the rotor bears a second engaging piece, wherein the engaging pieces are provided with claws as a positive-fit coupling.

7. The rotational speed superimposition device for a vehicle steering system according to claim 6, wherein the engaging pieces are provided with concave active surfaces which are designed to complement the convex tooth faces of the intermediate piece.

8. The rotational speed superimposition device for a vehicle steering system according to claim 1, wherein the intermediate piece is at least on one side provided with spacers arranged on the teeth in the axial direction.

9. The rotational speed superimposition device for a vehicle steering system according to claim 1, wherein the intermediate piece has an even number of teeth.

10. The rotational speed superimposition device for a vehicle steering system according to claim 9, wherein the number of teeth is eight.

* * * * *